(12) United States Patent
Tanaka et al.

(10) Patent No.: US 7,051,706 B2
(45) Date of Patent: May 30, 2006

(54) CONTROL MECHANISM FOR FUEL INJECTION PUMP

(75) Inventors: Masamichi Tanaka, Osaka (JP); Hajimu Imanaka, Osaka (JP)

(73) Assignee: Yanmar Co., Ltd. (JP)

( * ) Notice: Subject to any disclaimer, the term of this patent is extended or adjusted under 35 U.S.C. 154(b) by 0 days.

(21) Appl. No.: 11/244,008

(22) Filed: Oct. 6, 2005

(65) Prior Publication Data

US 2006/0048750 A1    Mar. 9, 2006

Related U.S. Application Data

(63) Continuation of application No. PCT/JP2004/005222, filed on Apr. 12, 2004.

(30) Foreign Application Priority Data

Apr. 14, 2003   (JP) .............................. 2003-109183

(51) Int. Cl.
*F02M 59/26* (2006.01)

(52) U.S. Cl. ...................... 123/357; 123/362; 123/366; 123/179.17

(58) Field of Classification Search .......... 123/179.16, 123/179.17, 357, 362, 366
See application file for complete search history.

(56) References Cited

U.S. PATENT DOCUMENTS 4,112,897 A * 9/1978 Hufendiek ................... 123/366
4,368,705 A * 1/1983 Stevenson et al. .......... 123/357

FOREIGN PATENT DOCUMENTS

JP    57 144230        9/1982
JP    10 325339        12/1998
JP    2000-234576     8/2000

OTHER PUBLICATIONS

International Search Report for International Application No. PCT/JP2004/005222; Mailed: Jun. 29, 2004.

* cited by examiner

*Primary Examiner*—Thomas Moulis
(74) *Attorney, Agent, or Firm*—Sterne, Kessler, Goldstein & Fox P.L.L.C.

(57) ABSTRACT

A control mechanism for a fuel injection pump comprises: an electronic governor which actuates a rack actuator by a controller for controlling a governing rack; and a cold start device which actuates an injection-quickening actuator by the controller for opening or closing a draining sub port formed in a plunger barrel so as to advance injection timing when an engine is cold. Different settings about control degree of the governing rack controlled by the controller are prepared for a case where the injection-quickening actuator is actuated to switch on the cold start device (as characteristic curve 61a), and for a case where the injection-quickening actuator is disactuated to switch off the cold start device (as characteristic curve 61b), respectively.

3 Claims, 9 Drawing Sheets (a)

(b)

(a)

(b)

(a)

(b)

CONTROL MECHANISM FOR FUEL INJECTION PUMP

CROSS REFERENCE TO RELATED APPLICATIONS

The present application is a Continuation of PCT Application No. PCT/JP2004/005222, filed Apr. 12, 2004, which is hereby incorporated in its entirety herein by reference thereto.

BACKGROUND OF THE INVENTION

1. Field of the Invention

The present invention relates to a control mechanism for a fuel injection pump for a diesel engine, the control mechanism being provided with an electronic governor and a cold start device for advancing injection timing during start of a cold engine. Particularly, the invention relates to the control mechanism which change a base position of a governing rack located by a controller in correspondence to switching on/off of the cold start device.

2. Background Art

Conventionally, there are well-known fuel injection pumps for a diesel engine. Each of the fuel injection pumps comprises a plunger, a plunger barrel, a distribution shaft, and a plurality of delivery valves, wherein the plunger is vertically slid in a plunger barrel so as to discharge pressurized fuel to the distribution shaft, an the distribution shaft sends to the delivery valves for delivering fuel to respective fuel injection nozzles.

Of the fuel injection pumps, there are well-known fuel injection pumps each of which is provided with an electronic governor having a rack actuator which is actuated by a controller so as to control a position of a governing rack (hereinafter, referred to as "rack position"), as disclosed in Japanese Laid Open Gazette No. Hei 10-325339. Due to the actuation of the rack actuator, the rack position is changed in correspondence to pump rotary speed so as to optimize injection quantity.

Of the fuel injection pumps, there is a well-known fuel injection pump provided with a Cold Start Device (hereinafter, referred to as "CSD") configured so that a draining sub port is formed in the plunger barrel, and a control actuates an injection-quickening actuator for opening and closing the draining sub port so as to change injection timing in correspondence to the rotary speed, as disclosed in Japanese Laid Open Gazette No. 2000-234576. When a cold engine starts to drive, the sub port is closed (i.e., CSD is switched on) so as to advance the injection timing, thereby smoothing facilitating start of the engine.

Depending on detection of engine temperature (temperature of engine cooling water), the controller selects a suitable one from rack position control maps of the electronic governor about engine rotary speed in correspondence to the detected engine temperature. Referring to FIG. 7(a), the map selection depends on the switching on/off of the cold start device, i.e., actuation/disactuation of CSD (the injection-quickening actuator). Each graph of FIGS. 7(a), 8(a) and 9(a) is drawn with pump rotary speed (replaceable with engine rotary speed) X as the x-axis, and with rack position R as the y-axis. The increase direction of rack position R corresponds to the direction for increasing injection quantity. Each of FIGS. 7(b), 8(b) and 9(b) graphs curves of injection quantity Q relative to pump rotary speed (replaceable with engine rotary speed) N, based on the corresponding rack position control map of each of FIGS. 7(a), 8(a) and 9(a).

FIG. 7(a) graphs a rack position control map 91a when the engine is cold (when CSD is switched on), and a rack position control map 91b when the engine is hot (when CSD is switched off). FIG. 7(b) graphs an injection quantity characteristic curve 92a when the engine is cold (when CSD is switched on), and an injection quantity characteristic curve 92b when the engine is hot (when CSD is switched off), curves 92a and 92b being obtained according to respective maps 91a and 91b. When the engine is cold, the rack position is shifted for reducing the injection quantity when the engine is cold (in relative to the same engine (pump) rotary speed, rack position R on graph 91a is smaller than rack position R on graph 91b), however, CSD is switched on for closing the sub port, thereby resulting in increase of the injection quantity (in relative to the same engine (pump) rotary speed, injection quantity Q on graph 92a is larger than injection quantity Q on graph 92b). Conversely speaking, when CSD is switched on, rack position R is shifted for reducing the injection quantity so as to prevent excessive increase of injection quantity.

In each of the rack position control maps, variation pattern of rack position relative to engine (pump) rotary speed is evened particularly in consideration of the hot engine condition. In this regard, on the assumption that CSD is not actuated, as characteristic curve 91b, when the rotary speed is equal to or exceeds a threshold rotary speed N2, rack position R serving as a parameter for the control of injection quantity is fixed to a rated rack position R2. It is now supposed that CSD is not actuated and the rotary speed is smaller than threshold rotary speed N2, i.e., the rotary speed is within an early engine-starting rotary speed range. When the rotary speed varies between 0 and a rotary speed N1 close to threshold rotary speed N2, a rack position R1, as shifted from rack position R2 in the direction for increasing the injection quantity, is selected as the base position for the control of injection quantity on starting of the engine, i.e., a fuel-increasing rack position for engine start, thereby quickly raising the engine rotary speed. As the rotary speed increases from N1 to N2, rack position R selected as the base position for the control of injection quantity moves from rack position R1 in the direction for reducing the injection quantity, and finally reaches rack position R2.

With respect to the exchange of rack position control map depending on the engine temperature (the actuation/disactuation of CSD), variation pattern of the rack position relative to variation of engine rotary speed, such as the curve shape of characteristic curve 91b, is not changed, but the electronic governor controlling gain relative to every engine rotary speed is simply reduced to even degree from the original value. Consequently, as shown in FIG. 7(a), characteristic curve 91a in actuated condition of CSD and characteristic curve 91b in disactuated condition of CSD are shaped as being shifted in parallel from each other along the y-axis. With respect to characteristic curve 91a, while the rotary speed varies within the range of rotary speed that is not smaller than rotary speed N2, a rated rack position R4, which is disposed at a position shifted from rated rack position R2 in the direction for reducing injection quantity, is selected as the base position for the control of injection quantity. While the rotary speed varies within the early engine-starting rotary speed range between 0 and N2, and especially when it varies between 0 and N1, a fuel-increasing rack position R3 for engine start a start, which is lower than rack position R1, is selected as the base position for the control of injection quantity. As the rotary speed within the early engine-starting rotary speed range varies from N1 to N2, a rack position selected as the base position for the control of injection quantity moves in the direction for reducing injection quantity from fuel-increasing rack position R3 for engine start, and finally, when the rotary speed reaches N2, the rack position reaches rated rack position R4.

In correspondence to this rack position control, as shown in FIG. 7(b), characteristic curve 92a of injection quantity of the cold engine (when CSD is actuated) and characteristic curve 92b of injection quantity of the hot engine (when CSD is not actuated) are necessarily shaped as being shifted from each other in parallel along the y-axis. As a result, during low speed rotation of the started cold engine (while CSD is actuated), the injection quantity is still large so as to cause black smoky exhaust gas. In this way, the rack control maps having a fixed variation pattern out of consideration of engine temperature variation restricts optimization of cold engine start and reduction of black smoke in exhaust gas during engine start-up.

To further optimize cold engine start and reduce black smoke in exhaust gas during engine start-up, the characteristic of controlled rack position has to correspond to the respective actuated and disactuated conditions of CSD, especially, by considering the fuel-increasing rack position for engine start.

Further, with respect to the conventional electronic governor, a minimum rack position R9 (for zeroing or substantially zeroing injection quantity) is set so as to prevent reduction of injection quantity from causing stop of the engine during sudden reduction of engine rotary speed.

As shown in FIG. 8(a), only the pump rotary speed is the parameter for setting the minimum rack. That is, a single characteristic curve 93 is set regardless of whether the engine is hot or cold (whether CSD is actuated or disactuated). With respect to the relation between characteristic curve 91a in actuated condition of CSD and characteristic curve 93, a rack position difference (undershoot U1) between rated rack position R3 and minimum rack position R9 is so small as to prevent undesirable influence onto the engine rotary speed. However, with respect to the relation between characteristic curve 91b in disactuated condition of CSD and characteristic curve 93, a rack position difference (undershoot U2) between rated rack position R2 and minimum rack position R9 is larger than undershoot U1, so that when operation for suddenly reducing engine rotary speed is performed in disactuated condition of CSD, the large undershoot U2 causes undesirably large degree of momentary reduction of engine rotary speed. In this regard, FIG. 8(b) graphs characteristic curves 94a and 94b of injection quantity control pattern (N–Q characteristics), which correspond to the minimum rack position pattern (N–R characteristic) shown in FIG. 8(a) adapted to the actuated condition of CSD and to the disactuated condition of CSD, respectively.

Similar to the characteristic curves of FIG. 7(b), characteristic curves 92a and 92b express characteristics of controlled injection quantity without the minimum rack position control for the actuated condition of CSD and for the disactuated condition of CSD, respectively. The problem of undershoot during sudden speed down operation is described as the above. On the contrary, if sudden speed up operation is performed, the problem arises that overshoot becomes so large as to cause undesirably large degree of momentary increase of engine rotary speed.

To reduce the momentary reduction and increase of engine rotary speed, the minimum rack position variation should be set to have characteristics suitable for the actuated condition of CSD and for the disactuated condition of CSD, respectively.

Further, during start of a cold engine, due to the idle-up function of the conventional electronic governor, the low idle rotary speed of the engine is gradually reduced as the engine cooling water is heated.

During work of the idle-up function, as shown in FIG. 9(a), map data expressed as characteristic curve 95 is adapted to correspond to the relation of rack position to accelerator set value (target rotary speed (set value) set when the engine idles). The map data expressed by characteristic curve 95 is used for both the actuated and disactuated conditions of CSD. Namely, the same map data is used whether the CSD is actuated or disactuated.

However, as shown in FIG. 9(b), the injection quantity becomes different depending on whether or not CSD is actuated because the presence or absence of fuel draining depends on whether or not CSD is actuated. Even if the same rack position is set relative to the same accelerator set value regardless of the actuation or disactuation of CSD, actual injection quantity becomes different, i.e., the engine rotary speed becomes different depending whether or not CSD is actuated. Namely, in correspondence to the single map data for controlling injection quantity (engine rotary speed), two different characteristic curves 96a (in actuated condition of CSD) and 96b (in disactuated condition of CSD) about actual engine rotary speed variation are established.

Consequently, when a cold engine started in the actuated condition of CSD is warmed and the actuated CSD is shifted into the disactuated condition, injection quantity is suddenly reduced and the engine rotary speed is suddenly reduced, thereby causing discomfort of an operator.

Therefore, to prevent fluctuation of engine rotary speed in no load (idle) condition, the characteristic curve is required to correspond to the respective actuated and disactuated conditions of CSD.

The present invention takes the above problems into account for setting N–R characteristic curve corresponding to the respective actuated and disactuated conditions of CSD, thereby optimizing start of a cold engine and reduction of black smoke in exhaust gas, and ensuring stable operation of an engine with no fluctuation of engine rotary speed.

BRIEF SUMMARY OF THE INVENTION

An object of the present invention is to provide an improved control mechanism for a fuel injection pump, comprising: an electronic governor which actuates a rack actuator by a controller for controlling a governing rack; and a cold start device which actuates an injection-quickening actuator by the controller for opening or closing a draining sub port formed in a plunger barrel so as to advance injection timing when an engine is cold, wherein the controller stores a first map, having a characteristic curve of governing rack position in switch-on condition of the cold start device, and a second map, having a characteristic curve of governing rack position in switch-off condition of the cold start device, and controls the governing rack due according to one of the maps selected depending on whether the cold start device is switched on or off, and wherein, when pump rotary speed of the fuel injection pump is larger than a threshold value, the characteristic curve of governing rack position as the first map is expressed as shifted in the direction for reducing injection quantity from the characteristic curve of governing rack position as the second map.

In a first aspect of the present invention, with respect to each of the first and second maps, when the pump rotary speed is lower than the threshold value, the governing rack position is set at a fuel-increasing rack position for engine start. When the pump rotary speed is close to 0, the first and second maps have substantially the same fuel-increasing rack position for engine start. As the pump rotary speed increases from 0 to the threshold value, the fuel-increasing rack position for engine start in the second map is kept constant, and the fuel-increasing rack position for engine start in the first map moves in the direction for reducing injection quantity.

Therefore, suitable one of different N–R characteristic curves can be selected depending on whether the cold start device is actuated or disactuated, thereby optimizing engine start whether the engine is cold or hot, and ensuring stable driving of the engine without fluctuation of engine rotary speed. Especially, engine start with actuation of the cold start device can be optimized in reduction of black smoke in exhaust gas of a cold engine. Further, the engine can be stably driven without fluctuation of engine rotary speed.

In a second aspect of the present invention, in correspondence to governing rack position control by the first map and by the second map, the controller stores respective minimum rack positions each of which is a limit position limiting shift of the governing rack position in the direction for reducing injection quantity, so that the minimum rack position corresponding to the first map is disposed at a position shifted in the direction for reducing injection quantity from the minimum rack position corresponding to the second map.

Therefore, undershoot is reduced whether the cold start device is actuated or disactuated, thereby preventing engine rotary speed from being suddenly reduced.

In a third aspect of the present invention, in correspondence to governing rack position control by the first map and by the second map, the controller stores respective rack positions in no load condition, so that the rack position in no load condition corresponding to the first map is disposed at a position shifted in the direction for reducing injection quantity from the rack position in no load condition corresponding to the second map.

Therefore, fluctuation of engine rotary speed can be prevented when the actuated cold start device is changed into the disactuated condition. Not applicable.

BRIEF DESCRIPTION OF THE DRAWINGS/FIGURES

FIG. 4(a) graphs N–R (pump rotary speed N—rack position R) characteristic curves according to a first embodiment.

FIG. 4(b) graphs N–Q (pump rotary speed N—injection quantity Q) characteristic curves according to the first embodiment.

FIG. 5(a) graphs N–R characteristic curves according to a second embodiment.

FIG. 5(b) graphs N–Q characteristic curves according to the second embodiment.

Figure 6:
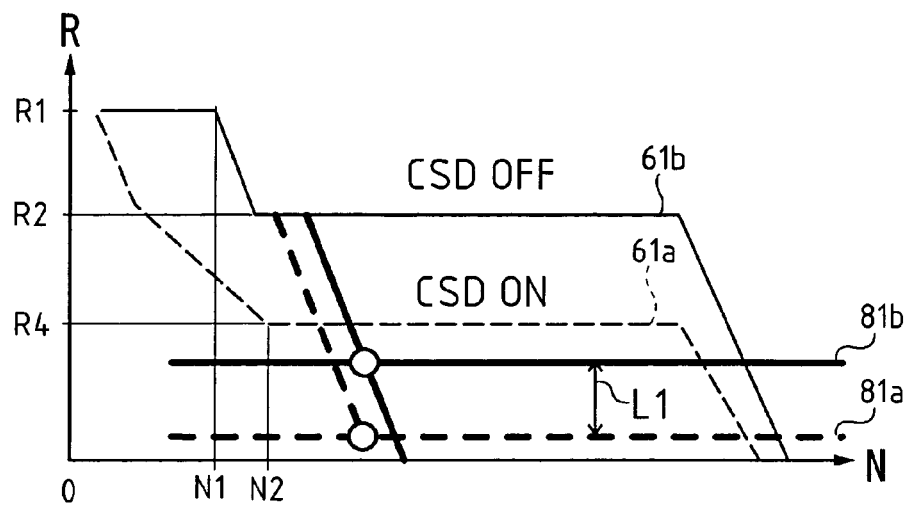
Figure 6:
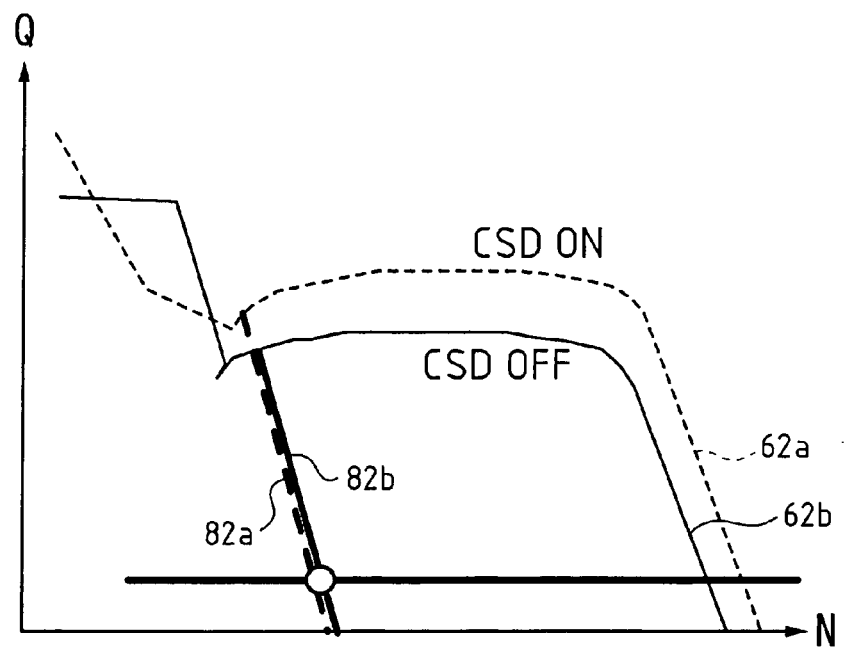

FIG. 6(a) graphs N–R characteristic curves according to a third embodiment.

FIG. 6(b) graphs N–Q characteristic curves according to the third embodiment.

Figure 7:
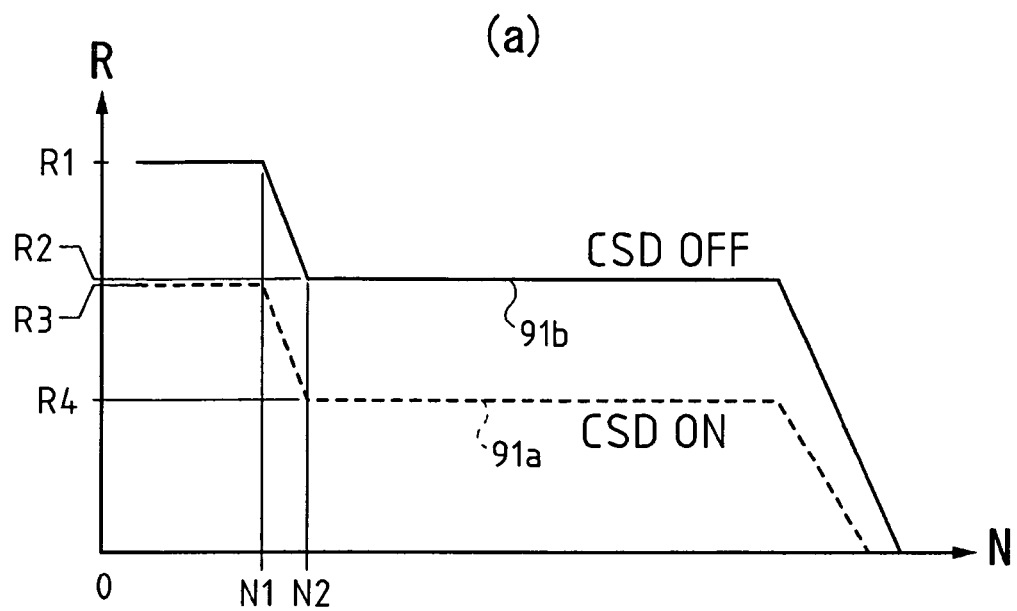
Figure 7:
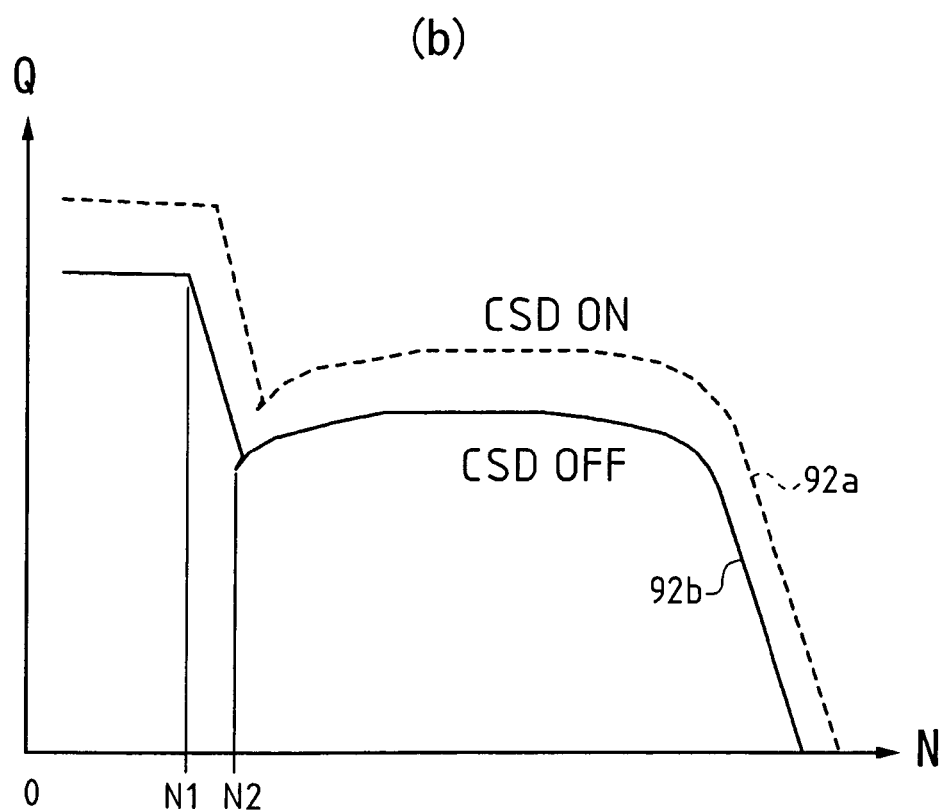

FIG. 7(a) graphs characteristic curves of fuel-increasing rack position for engine start set in the conventional way.

FIG. 7(b) graphs characteristic curves of injection quantity corresponding to the conventional setting of fuel-increasing rack position for engine start.

Figure 8:
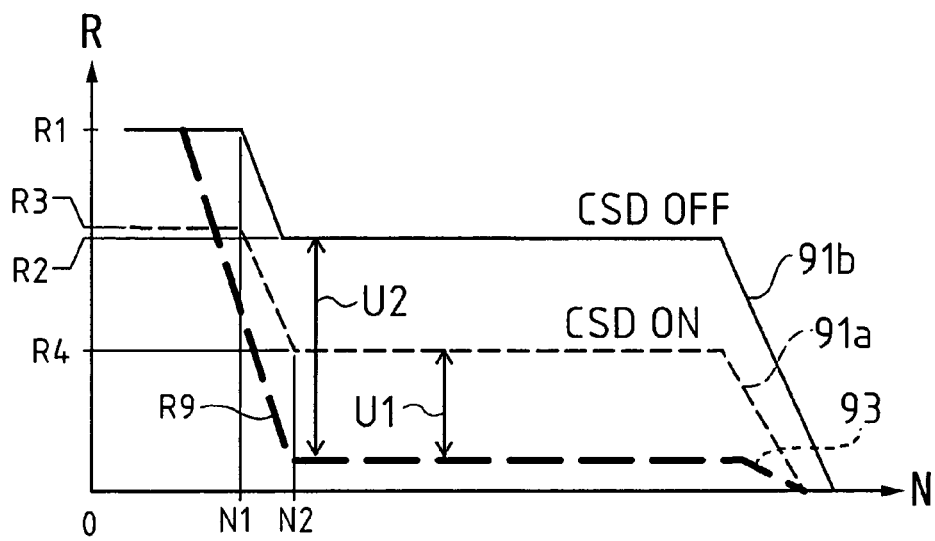
Figure 8:
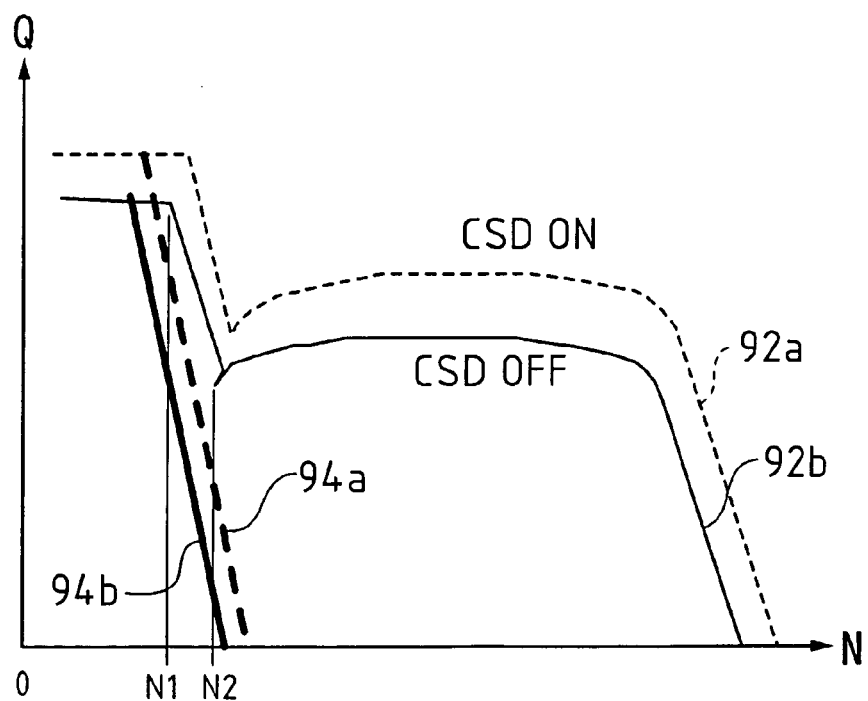

FIG. 8(a) graphs characteristic curves of minimum rack position set in the conventional way.

FIG. 8(b) graphs characteristic curves of injection quantity corresponding to the conventional setting of minimum rack position.

Figure 9:
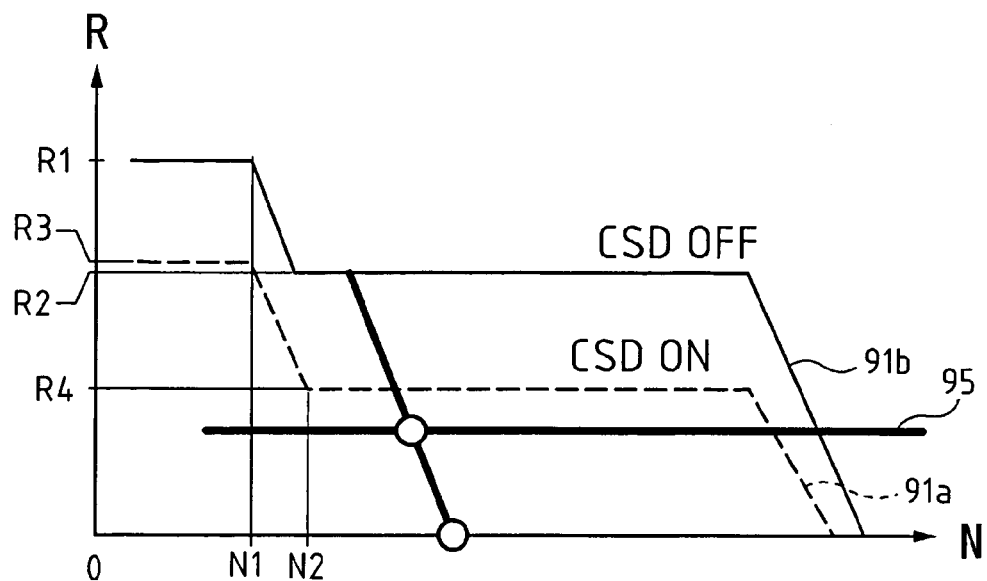
Figure 9:
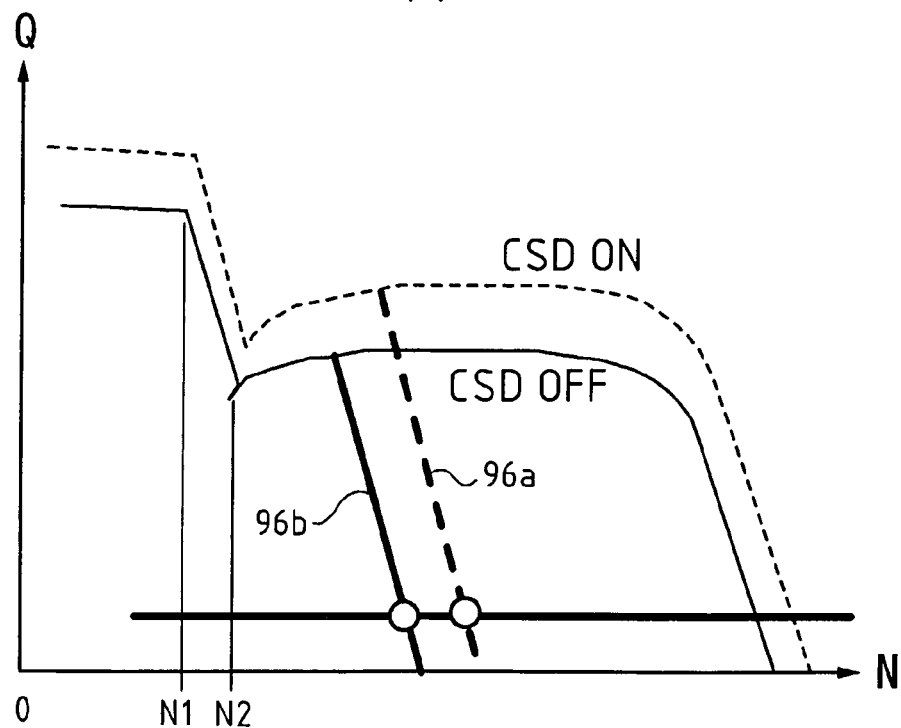

FIG. 9(a) graphs characteristic curves of rack position in no load condition set in the conventional way.

FIG. 9(b) graphs characteristic curves of injection quantity corresponding to the conventional setting of rack position in no load condition. Not applicable.

DETAILED DESCRIPTION OF THE INVENTION

Best Mode for Carrying out the Invention

An embodiment of the invention will be described with reference to the drawings.

Hereinafter, description depends on the assumption that a fuel injection pump 1 faces forward to the left side of the sheet of FIG. 1.

Fuel injection pump 1 according to the present invention is adapted to be mounted on a diesel engine. Configuration of fuel injection pump 1 will be described.

Figure 1:
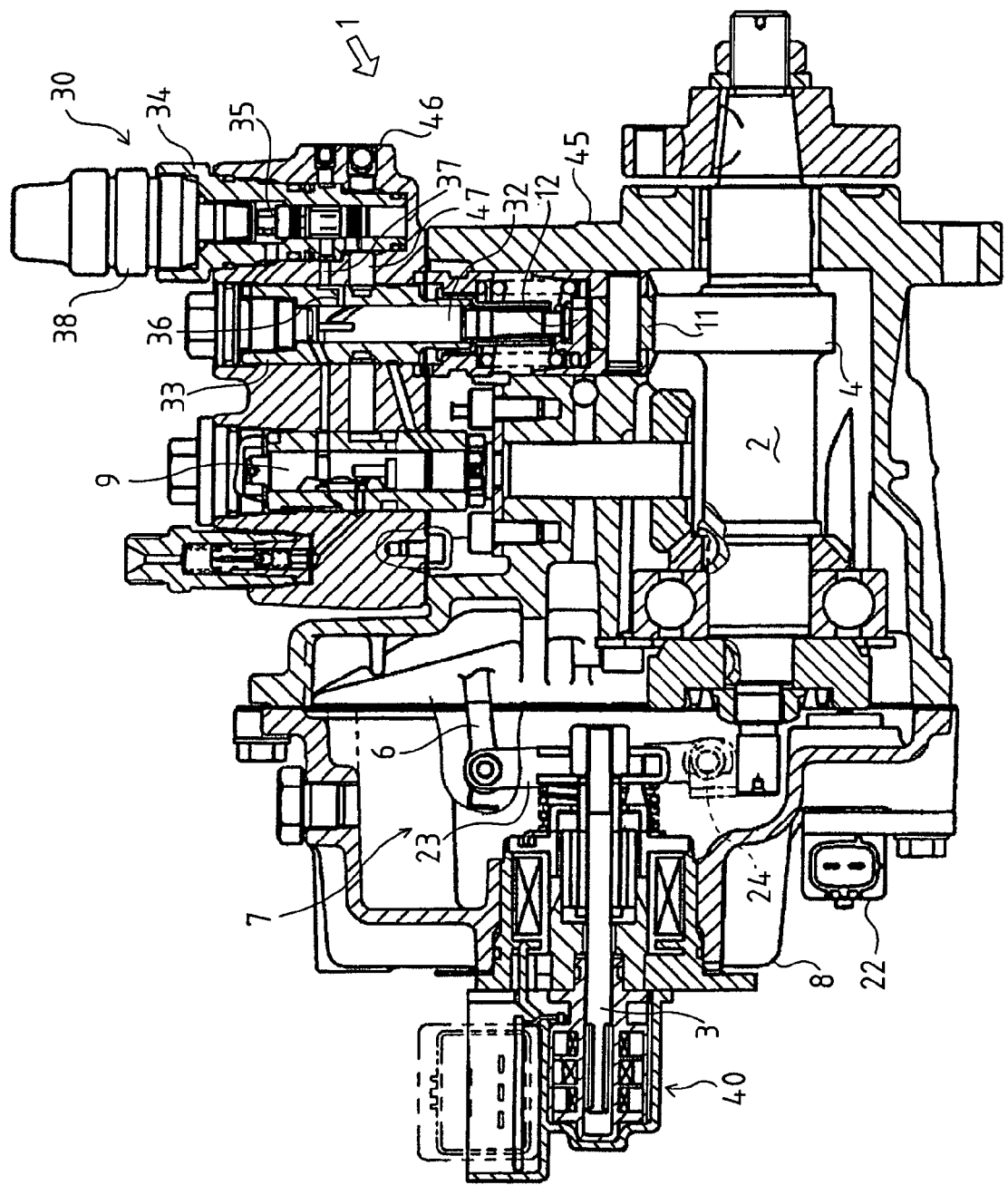
FIG. 1 is a sectional side view of a fuel injection pump to be adapted to employ the present invention.

As shown in FIG. 1, fuel injection pump 1 comprises a hydraulic head 46 and a pump housing 45, which are vertically joined to each other. A casing 8 of an electronic governor 7 is attached onto a front surface of pump housing 45. A rack actuator 40 is fixedly inserted from the left side into casing 8.

Rack actuator 40 has fore-and-aft reciprocally movable slide shaft 3, which is pivotally connected at a tip thereof to an intermediate portion of a link lever 23.

Link lever 23 has a lower portion disposed rotatably about a base pin 24, and has an upper portion pivotally connected to a control lever 6. By the fore-and-aft reciprocation of slide shaft 3, link lever 23 rotates in the fore-and-aft direction centered on base pin 24 so as to move control lever 6 in the fore-and-aft direction, thereby operating an unshown governing rack for rotating a plunger 32, i.e., for increasing or reducing injection quantity.

A rotary sensor 22 for detecting rotary speed of pump camshaft 2 is attached below casing 8.

Figure 2:
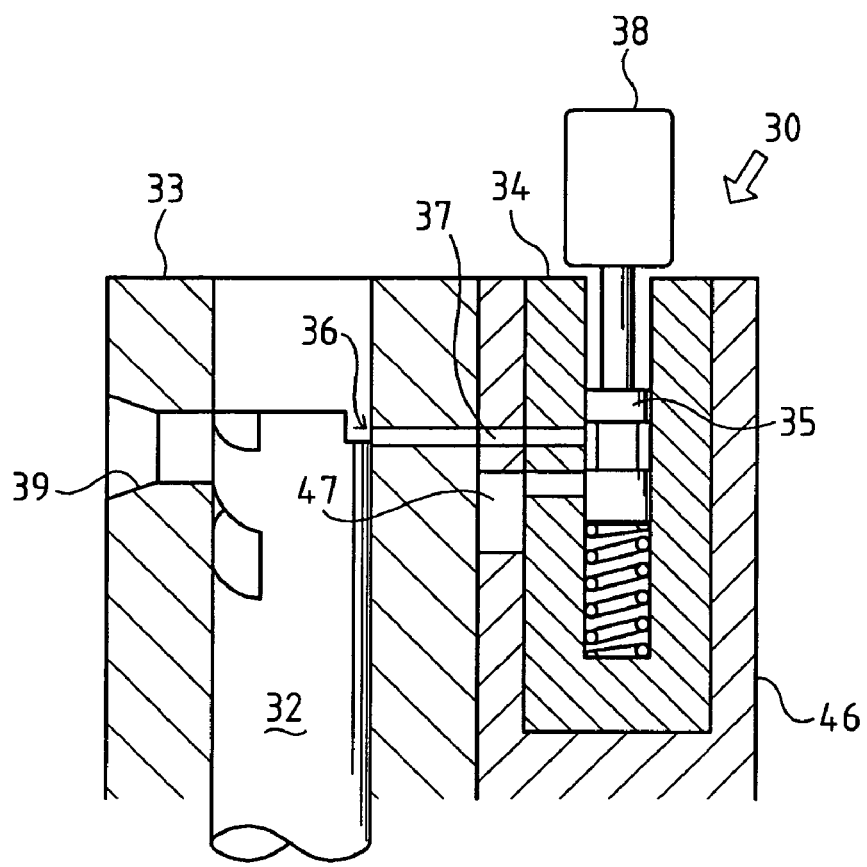
FIG. 2 is a sectional view of CSD.

As shown in FIGS. 1 and 2, a plunger barrel 33 is fitted in hydraulic head 46, and plunger 32 is vertically slidably fitted in plunger barrel 33. Plunger 32 is vertically moved by rotating a cam 4 formed on pump camshaft 2 via a tappet roller 11 (see FIG. 1) and a tappet 12, so as to charge pressurized fuel from a main port 39 formed in plunger barrel 33 to a distribution shaft 9 (see FIG. 1).

A cold start device (hereinafter referred to as "CSD 30") has a piston barrel 34 is fitted in hydraulic head 46 beside plunger barrel 33, and has a piston 35 in piston barrel 34 so as to be vertically slid by a injection-quickening actuator 38.

A draining sub port 36 is formed in plunger barrel 33 and connected to piston barrel 34 via a drain passage 37. When injection-quickening actuator 38 is actuated, piston 35 is moved upward so as to separate draining sub port 36 with drain passage 37 from a low-pressure chamber 47 formed in hydraulic head 46, thereby advancing the injection timing.

When injection-quickening actuator 38 is not actuated, piston 35 is shifted downward so as to connect draining sub port 36 through drain passage 37 to low-pressure chamber 47 in hydraulic head 46, thereby draining a part of fuel compressed by plunger 32 to low-pressure chamber 47 for delaying the injection timing.

Figure 3:
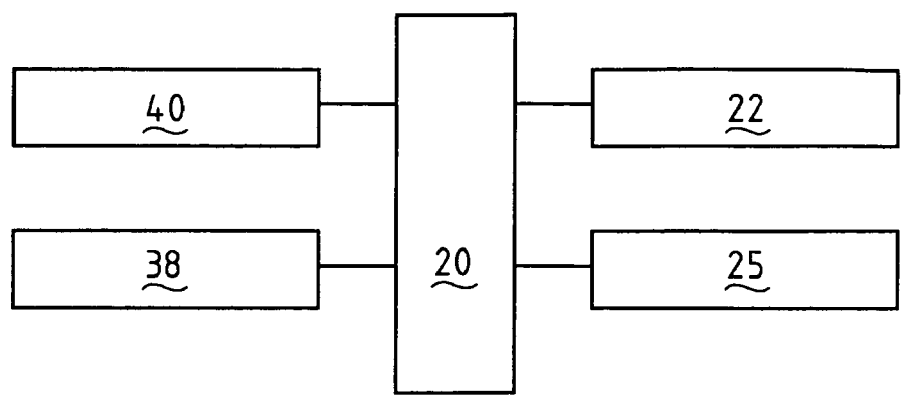
FIG. 3 is a block diagram of a control mechanism according to the present invention.

As shown in FIG. 3, a rack actuator 40 of electronic governor 7 and injection-quickening actuator 38 of CSD 30 are electrically connected to controller 20. Also, rotary sensor 22 for detecting the rotary speed of pump camshaft 2 and a water temperature sensor 25 for detecting temperature of engine cooling water are electrically connected to controller 20.

With respect to a shift degree of the governing rack (adjusted fuel quantity) depending on the actuation of rack actuator 40 controlled by controller 2, different shift degree settings are prepared for the case where injection-quickening actuator 38 is actuated to switch on CSD 30, and for the case where injection-quickening actuator 38 is disactuated to switch off CSD 30, respectively.

Description will now be given of embodiments of control mechanism of the present invention for the fuel injection pump configured as the above.

(1) FIRST EMBODIMENT

A control mechanism of this embodiment, as shown in FIGS. 1 to 4, is provided for fuel injection pump 1 comprising electronic governor 7 and cold start device 30. Electronic governor 7 is controlled by controller 20 so as to actuate rack actuator 40 for controlling a position of a governing rack. Cold start device 30 is controlled by controller 20 so as to control injection-quickening actuator 38 for opening or closing draining sub port 36 formed in plunger barrel 38, thereby advancing the fuel injection timing of a cold engine. With respect to a fuel-increasing rack position of the governing rack for engine start depending on the control by controller 20, different fuel-increasing rack position settings are prepared for the case where injection-quickening actuator 38 is actuated for switching on CSD 30 (as a characteristic curve 61a shown in FIG. 4(a)), and for the case where injection-quickening actuator 38 is disactuated for switching off CSD 30 (as a characteristic curve 61b shown in FIG. 4(a)), respectively.

As shown in FIG. 4(a), depending on whether injection-quickening actuator 38 (CSD 30) is actuated or not, the fuel-increasing rack position for engine start relative to pump rotary speed N is expressed by selected one of different characteristic curves 61a and 61b.

While pump rotary speed N varies between 0 and threshold rotary speed N2, i.e., within the early engine-starting rotary speed range, rack position characteristic curve 61a in actuated condition of CSD 30 has different curve shape from rack position characteristic curve 61b in disactuated condition of CSD 30, thereby preparing different variation patterns of injection quantity during increase of rotary speed for the actuating condition of CSD and for the disactuating condition of CSD, respectively (see FIG. 4(b)).

While the pump rotary speed varies in the range or rotary speed that is not less than threshold rotary speed N2, rack position characteristic curve 61a in actuated condition of CSD 30 is held at rack position R4, as being shifted down from rack position characteristic curve 61b in disactuated condition of CSD (see FIG. 4(b)). In this way, characteristic curve 61a and 61b are set at respective different rack position so as to change injection quantity depending on whether the CSD is actuated or not.

Consequently, characteristic curves 61a and 61b do not overlap each other even if one is shifted in parallel along the y-axis to approach the other.

A portion of rack position characteristic curve 61b in disactuated condition of CSD, while the rotary speed varies within the early engine-starting rotary speed range, depends upon fixed rack position R1 (fuel-increasing rack position for engine start) serving as the base position for the control of injection quantity because the main purpose at this time is to quickly raise engine speed. (When the engine is hot, such a large injection quantity does not cause so much black smoke in exhaust gas.) On the other hand, a portion of rack position characteristic curve 61a in actuated condition of CSD, while the rotary speed varies within the early engine-starting rotary speed range, depends upon variable rack position R serving as the base position for the control of injection quantity, which is set at rack position R1 when rotary speed N is 0, similar to the curve in disactuated condition of CSD, and moves in the direction for reducing injection quantity as the rotary speed increases from 0. Therefore, when the rotary speed reaches a middle point in the early engine-starting rotary speed range, various rack position R serving as the base position for the control of injection quantity comes at a position which is considerably shifted from conventional fuel-increasing rack position R3 for engine start in the direction for reducing injection quantity, thereby effectively reducing black smoke in exhaust gas at an early time of starting the cold engine.

Conventionally, while the engine rotary speed varies over the whole range of engine rotary speed, rack position R serving as the base position for the control of injection quantity during CSD is disposed at a position shifted at a constant degree from that in disactuated condition of CSD, so that the maximum rack position of the fuel-injection positions for engine start comes to a position shifted from rack position R1 in disactuated condition of CSD in the direction for reducing injection quantity. However, with respect to rack position characteristic curve 61a in actuated condition of CSD according to the present embodiment, rack position R serving as the base position for the control of injection quantity is set at rack position R1 when the rotary speed is 0, and the rack position serving as the base position for the control of injection quantity moves in the direction for reducing injection quantity as the rotary speed increases from 0 for the early period of starting the cold engine. Characteristic curves 61a and 61b are provided as control maps stored in controller 20.

In this way, characteristic curve 61a for switching-on of CSD 30 is optimized in consideration of both merit and demerit of CSD 30 switched-on for advancing injection timing. The merit is improvement in rising of rotary speed of a started cold engine, and the demerit is increase of black smoky exhaust gas. Characteristic curve 61a is set separately from characteristic curve 61b for switching-off of CSD 30.

When an engine is started, controller 20 recognizes temperature of engine cooling water due to detection by water temperature sensor 25. When the temperature of engine cooling water temperature is lower than a preset value, controller 20 decides injection-quickening actuator 38 (CSD 30) to be actuated, and selects characteristic curve 61a as the control map for rack actuator 40 controlling the fuel-increasing rack position for engine start. Therefore, rack actuator 40 is controlled based on the selected control map.

On the other hand, when the temperature of engine cooling water detected when starting the engine is higher than the preset value, controller 20 decides injection-quickening actuator 38 (CSD 30) to be disactuated, and selects characteristic curve 61b as the control map for rack actuator 40 controlling the fuel-increasing rack position for engine start. Therefore, rack actuator 40 is controlled based on the selected control map.

Figure 4:
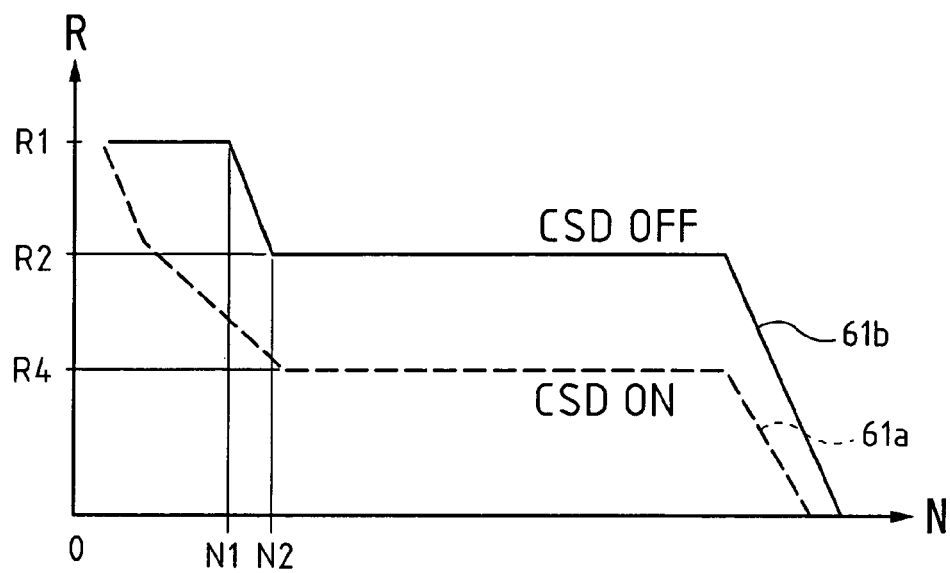
Figure 4:
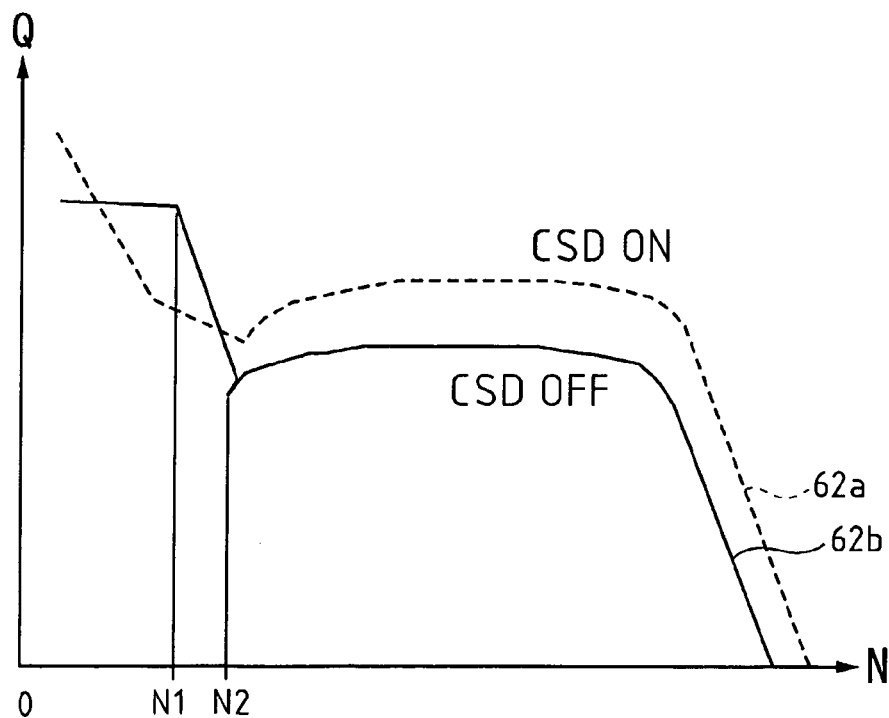

Due to this control, characteristic curves of injection quantity Q as show in FIG. 4(*b*) are established in correspondence to respective characteristic curves 61a and 61b of fuel-increasing rack position for engine start as shown in FIG. 4(*a*). That is, in FIG. 4(*b*), characteristic curve 62a corresponds to characteristic curve 61a of fuel-increasing rack position for engine start in actuated condition of CSD 30, and characteristic curve 62b corresponds to characteristic curve 61b of fuel-increasing rack position for engine start in disactuated condition of CSD 30. In this way, characteristic curves 62a and 62b express different characteristics. Especially, while pump rotary speed varies from 0 to N1, that is the range corresponding to the early period of engine start, the rack position is selected as the fuel-increasing rack position for engine start. If CSD is disactuated, injection quantity Q is kept constant during the increase of rotary speed from 0 to N1. On the contrary, it is now supposed that CSD is actuated. When the rotary speed is 0, injection quantity Q is very large because rack position R serving as the base position for the control of injection quantity is set at rack position R1, similar to the rack position at the same time when CSD is disactuated, and because the draining sub port is closed. Further, as noticed from the graph, injection quantity Q in actuated condition of CSD is reduced and reduced as the engine rotary speed increases from 0 to N1. When the increased rotary speed becomes close to N1, injection quantity Q in actuated condition of CSD becomes smaller than injection quantity Q in disactuated condition of CSD. Namely, in the condition that the engine is cold, injection quantity is increased immediately after starting the engine, in addition to the injection-quickening by the actuation of CSD, so as to ensure smooth rising of engine rotary speed, and afterward, as the rotary speed increases, the injection quantity is gradually reduced so as to reduce black smoke in exhaust gas during engine start-up.

In this way, one of different characteristics of rack position (N–R characteristics) is selected depending of whether CSD is actuated or disactuated, so as to establish the corresponding characteristic of injection quantity Q (N–Q characteristic), thereby ensuring optimum engine start with reduction of black smoke in exhaust gas for the respective cases.

(2) SECOND EMBODIMENT

A control mechanism of this embodiment, as shown in FIGS. 1 to 4, is provided for fuel injection pump 1 comprising electronic governor 7 and cold start device 30. Electronic governor 7 is controlled by controller 20 so as to actuate rack actuator 40 for controlling a position of a governing rack. Cold start device 30 is controlled by controller 20 so as to control injection-quickening actuator 38 for opening or closing draining sub port 36 formed in plunger barrel 38, thereby advancing the fuel injection timing of a cold engine. With respect to a minimum rack position of the governing rack depending on the control by controller 20, different minimum rack position settings are prepared for the case where injection-quickening actuator 38 is actuated for switching on CSD 30 (as a characteristic curve 71a shown in FIG. 5(*a*)), and for the case where injection-quickening actuator 38 is disactuated for switching off CSD 30 (as a characteristic curve 71b shown in FIG. 5(*a*)), respectively.

Figure 5:
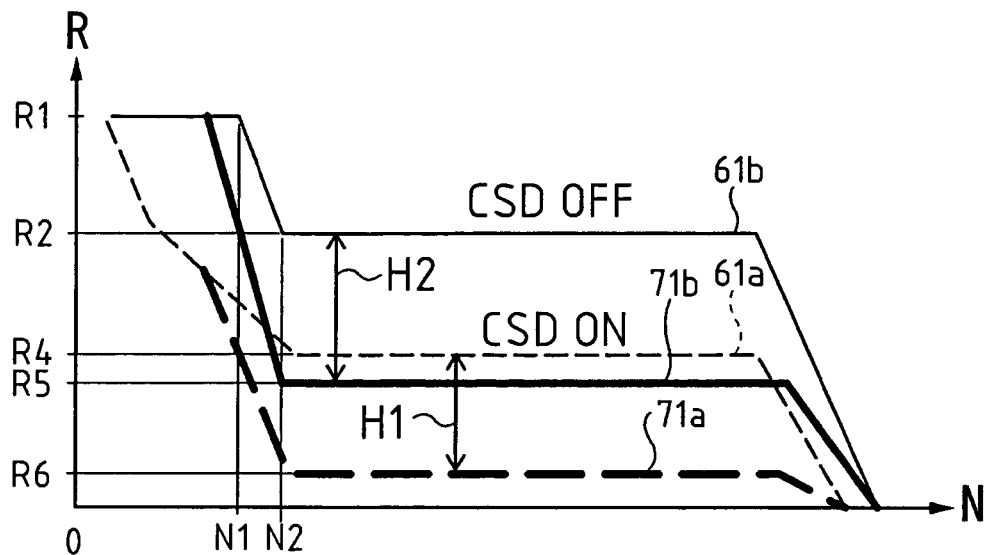
Figure 5:
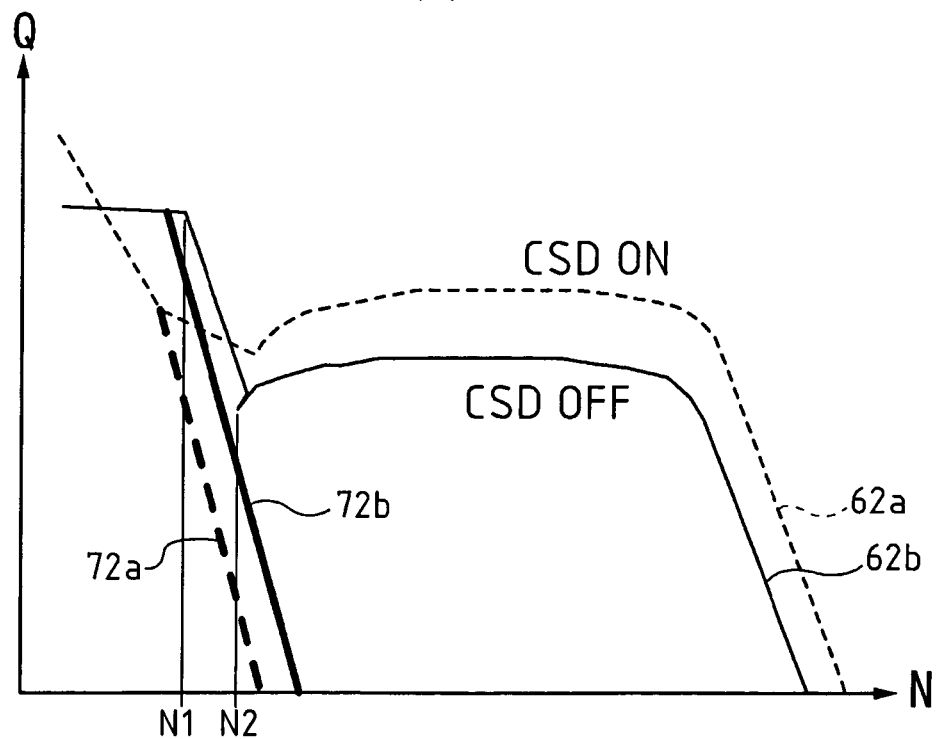

As shown in FIG. 5(*a*), a minimum rack position (for zeroing (or substantially zeroing) injection quantity) R5 in disactuated condition of injection-quickening actuator 38 (CSD 30) is disposed at a position shifted in the direction for increasing injection quantity from a minimum rack position R6 in actuated condition of injection-quickening actuator 38 (CSD 30). On this assumption, different characteristic curves 71a and 71b of minimum rack position control are prepared for the actuated condition of CSD 30 and for the disactuated condition of CSD 30, respectively. In this regard, characteristic curves 71a and 71b are based on characteristic curves 61a and 61b of rack position control for the actuated condition of CSD 30 and for the disactuated condition of CSD 30 shown in FIG. 4(*a*). Especially, while the engine rotary speed increases within the range for the early period of engine start, the rack position in each of the CSD conditions is shifted from the corresponding fuel-increasing rack position for engine start to the corresponding minimum rack position. The rack position shift from the fuel-increasing rack position to the minimum rack position starts when the rotary speed within the range rises to some degree (i.e., when the rotary speed reaches low rotary speed value N1). With respect to characteristic curve 71a in actuated condition of CSD 30, when the increased rotary speed reaches N1, the fuel-increasing rack position has been reduced following the increase of rotary speed before the start of rack position shift to minimum rack position R6, thereby smoothing the rack position shift to minimum rack position R5. When CSD 30 is disactuated, the rack position is substantially held at rack position R1 while the rotary speed varies within this range. However, minimum rack position R5 is rather high so that the degree of rack position shift from rack position R1 to minimum rack position R5 can be small. Controller 20 stores characteristic curves 71a and 71b as control maps.

With respect to characteristic curve 71a in actuated condition of CSD 30, an undershoot H1 from rated rack position R2 to minimum rack position R6 is set for the case that the engine is suddenly slowed down in actuated condition of CSD 30, thereby putting the degree of momentary reduction of engine rotary speed into an acceptable range.

Similarly, with respect to characteristic curve 71b in disactuated condition of CSD 30, an undershoot H2 from rated rack position R4 to minimum rack position R5, which is disposed at a position shifted from minimum rack position R6 in the direction for increasing injection quantity, is set for the case that the engine is suddenly slowed down in disactuated condition of CSD 30, thereby putting the degree of momentary reduction of engine rotary speed into an acceptable range.

In this way, since different characteristic curves 71a and 71b are prepared for the respective actuated condition and disactuated condition of CSD, respective undershoots H1 and H2 are set for the respective conditions of CSD, so that the degree of momentary reduction of engine rotary speed during sudden speed down operation in the disactuated condition of CSD can be restricted within the acceptable range.

Controller 20 measures engine temperature of engine cooling water due to detection by water temperature sensor 25. When the temperature of engine cooling water temperature is lower than a preset value, controller 20 decides injection-quickening actuator 38 (CSD 30) to be actuated, and selects characteristic curve 71a as the control map for rack actuator 40 controlling the minimum rack position. Therefore, rack actuator 40 is controlled based on the selected control map.

On the other hand, when the temperature of engine cooling water is higher than the preset value, controller 20 decides injection-quickening actuator 38 (CSD 30) to be disactuated, and selects characteristic curve 71b as the control map for rack actuator 40 controlling the minimum rack position. Therefore, rack actuator 40 is controlled based on the selected control map.

Due to this control, characteristic curves of injection quantity Q as show in FIG. 5(b) are established in correspondence to respective characteristic curves 71a and 71b of minimum rack position as shown in FIG. 5(a). That is, in FIG. 5(b), characteristic curve 72a corresponds to characteristic curve 71a of minimum rack position in actuated condition of CSD 30, and characteristic curve 72b corresponds to characteristic curve 71b of minimum rack position in disactuated condition of CSD 30. In this way, characteristic curves 72a and 72b express different characteristics.

In this way, characteristic of injection quantity (N–Q characteristic) can be exchanged so as to optimize (reduce) undershoot in correspondence to whether CSD 30 is actuated or disactuated. Namely, whether CSD 30 is actuated or disactuated, the degree of momentary reduction of engine rotary speed during sudden speed down operation can be restricted within the acceptable range.

The present embodiment is directed to optimization (reduction) of undershoot when the engine is suddenly slowed down. Alternatively, the above control can be utilized for optimizing (reducing) overshoot when the engine is suddenly accelerated (or suddenly unloaded), so as to restrict the degree of momentary increase of engine rotary speed within an acceptable range.

(3) THIRD EMBODIMENT

A control mechanism of this embodiment, as shown in FIGS. 1 to 3 and 6, is provided for fuel injection pump 1 comprising electronic governor 7 and cold start device 30. Electronic governor 7 is controlled by controller 20 so as to actuate rack actuator 40 for controlling a position of a governing rack. Cold start device 30 is controlled by controller 20 so as to control injection-quickening actuator 38 for opening or closing draining sub port 36 formed in plunger barrel 38, thereby advancing the fuel injection timing of a cold engine. With respect to a rack position of the governing rack in no load condition depending on the control by controller 20, different rack position settings are prepared for the case where injection-quickening actuator 38 is actuated for switching on CSD 30 (as a characteristic curve 81a shown in FIG. 6(a)), and for the case where injection-quickening actuator 38 is disactuated for switching off CSD 30 (as a characteristic curve 81b shown in FIG. 6(a)), respectively.

As shown in FIG. 6(a), with respect to the rack position variation relative to pump rotary speed N in no load condition, different characteristic curves 81a and 81b are set for the actuated condition of injection-quickening actuator 38 (CSD 30), and for the disactuated condition of injection-quickening actuator 38 (CSD 30), respectively. Controller 20 stores characteristic curves 81a and 81b as the control maps.

Characteristic curve 81a expresses the rack position variation in no load (idle) condition and in actuated condition of CSD 30. Characteristic curve 81b expresses the rack position variation in no load (idle) condition and in disactuated condition of CSD 30.

The rack position depending on characteristic curve 81b is disposed as shifted from that depending on characteristic curve 81a in the direction for increasing injection quantity, so that the injection quantity in disactuated condition of CSD 30 can be leveled up to that in actuated condition of CSD 30 against the fuel draining in disactuated condition of CSD 30.

In this setting, controller 20 measures engine temperature of engine cooling water due to detection by water temperature sensor 25. When the temperature of engine cooling water temperature is lower than a preset value, controller 20 decides injection-quickening actuator 38 (CSD 30) to be actuated, and selects characteristic curve 81a as the control map for rack actuator 40 controlling the rack position in no load condition. Therefore, rack actuator 40 is controlled based on the selected control map.

On the other hand, when the temperature of engine cooling water is higher than the preset value, controller 20 decides injection-quickening actuator 38 (CSD 30) to be disactuated, and selects characteristic curve 81b as the control map for rack actuator 40 controlling the rack position in no load condition. Therefore, rack actuator 40 is controlled based on the selected control map.

Due to this control, characteristic curves of injection quantity Q are established as show in FIG. 6(b). That is, in FIG. 6(b), characteristic curve 82a corresponds to characteristic curve 81a of rack position in no load condition and in actuated condition of CSD 30, and characteristic curve 82b corresponds to characteristic curve 81b of rack position in no load condition and in disactuated condition of CSD 30.

Such characteristic curves 82a and 82b substantially coincide with each other.

Due to the substantial coincidence of characteristic curves 82a and 82b, the pump rotary speed (engine rotary speed) variation in no load condition and in actuated condition of CSD substantially coincides with that in no load condition and in disactuated condition of CSD, thereby preventing fluctuation of engine rotary speed when the actuated CSD is shifted into the disactuated condition.

INDUSTRIAL APPLICABILITY

The control mechanism of the present invention can be generally applied for fuel injection pumps with electronic governors.

What is claimed is:

1. A control mechanism for a fuel injection pump, comprising:
   an electronic governor which actuates a rack actuator by a controller for controlling a governing rack; and
   a cold start device which actuates an injection-quickening actuator by the controller for opening or closing a draining sub port formed in a plunger barrel so as to advance injection timing when an engine is cold, wherein the controller stores a first map, having a characteristic curve of governing rack position in switch-on condition of the cold start device, and a second map, having a characteristic curve of governing rack position in switch-off condition of the cold start device, and controls the governing rack due according to one of the maps selected depending on whether the cold start device is switched on or off, and wherein, when pump rotary speed of the fuel injection pump is larger than a threshold value, the characteristic curve of governing rack position as the first map is expressed as shifted in the direction for reducing injection quantity from the characteristic curve of governing rack position as the second map, characterized in that, with respect to each of the first and second maps, when the pump rotary speed is lower than the threshold value, the governing rack position is set at a fuel-increasing rack position for engine start, that, when the pump rotary speed is close to 0, the first and second maps have substantially the same fuel-increasing rack position for engine start, and that, as the pump rotary speed increases from 0 to the threshold value, the fuel-increasing rack position for engine start in the second map is kept constant, and the fuel-increasing rack position for engine start in the first map moves in the direction for reducing injection quantity.

2. A control mechanism for a fuel injection pump, comprising:

an electronic governor which actuates a rack actuator by a controller for controlling a governing rack; and a cold start device which actuates an injection-quickening actuator by the controller for opening or closing a draining sub port formed in a plunger barrel so as to advance injection timing when an engine is cold, wherein the controller stores a first map, having a characteristic curve of governing rack position in switch-on condition of the cold start device, and a second map, having a characteristic curve of governing rack position in switch-off condition of the cold start device, and controls the governing rack due according to one of the maps selected depending on whether the cold start device is switched on or off, and wherein, when pump rotary speed of the fuel injection pump is larger than a threshold value, the characteristic curve of governing rack position as the first map is expressed as shifted in the direction for reducing injection quantity from the characteristic curve of governing rack position as the second map, characterized in that, in correspondence to governing rack position control by the first map and by the second map, the controller stores respective minimum rack positions each of which is a limit position limiting shift of the governing rack position in the direction for reducing injection quantity, so that the minimum rack position corresponding to the first map is disposed at a position shifted in the direction for reducing injection quantity from the minimum rack position corresponding to the second map.

3. A control mechanism for a fuel injection pump, comprising:

an electronic governor which actuates a rack actuator by a controller for controlling a governing rack; and a cold start device which actuates an injection-quickening actuator by the controller for opening or closing a draining sub port formed in a plunger barrel so as to advance injection timing when an engine is cold, wherein the controller stores a first map, having a characteristic curve of governing rack position in switch-on condition of the cold start device, serving as a fist map, and a second map, having a characteristic curve of governing rack position in switch-off condition of the cold start device, and controls the governing rack due according to one of the maps selected depending on whether the cold start device is switched on or off, and wherein, when pump rotary speed of the fuel injection pump is larger than a threshold value, the characteristic curve of governing rack position as the first map is expressed as shifted in the direction for reducing injection quantity from the characteristic curve of governing rack position as the second map, characterized in that, in correspondence to governing rack position control by the first map and by the second map, the controller stores respective rack positions in no load condition, so that the rack position in no load condition corresponding to the first map is disposed at a position shifted in the direction for reducing injection quantity from the rack position in no load condition corresponding to the second map.

* * * * *